United States Patent
Yamada

(10) Patent No.: US 10,373,030 B2
(45) Date of Patent: Aug. 6, 2019

(54) IMAGE PROCESSING APPARATUS THAT EXECUTES HALFTONE PROCESS ON TARGET IMAGE DATA INCLUDING EDGE PIXEL

(71) Applicant: BROTHER KOGYO KABUSHIKI KAISHA, Nagoya-shi, Aichi-ken (JP)

(72) Inventor: Ryuji Yamada, Ogaki (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 26 days.

(21) Appl. No.: 15/714,002

(22) Filed: Sep. 25, 2017

(65) Prior Publication Data

US 2018/0096234 A1    Apr. 5, 2018

(30) Foreign Application Priority Data

Sep. 30, 2016  (JP) ................ 2016-192903

(51) Int. Cl.
| G06K 15/00 | (2006.01) |
| G06K 15/02 | (2006.01) |
| H04N 1/04 | (2006.01) |
| H04N 1/405 | (2006.01) |
| H04N 1/409 | (2006.01) |
| H04N 1/52 | (2006.01) |

(52) U.S. Cl.
CPC ....... *G06K 15/1881* (2013.01); *H04N 1/0458* (2013.01); *H04N 1/405* (2013.01); *H04N 1/4092* (2013.01); *H04N 1/52* (2013.01); *H04N 1/409* (2013.01)

(58) Field of Classification Search
CPC combination set(s) only.
See application file for complete search history.

(56) References Cited

U.S. PATENT DOCUMENTS

| 8,995,021 B2 * | 3/2015 | Li ..................... H04N 1/58 358/1.9 |
| 10,070,008 B2 * | 9/2018 | Haruta ............ H04N 1/00748 |
| 2015/0332115 A1 * | 11/2015 | Kakuta ............... G06K 9/4652 382/165 |

FOREIGN PATENT DOCUMENTS

| JP | 2002-2023 A | 1/2002 |
| JP | 2011-176556 A | 9/2011 |

* cited by examiner

*Primary Examiner* — Barbara D Reinier
(74) *Attorney, Agent, or Firm* — Merchant & Gould P.C.

(57) ABSTRACT

In a case where a dot forming condition is not satisfied, whether to form a dot for a target pixel is determined according to a predetermined method and dependently on a colorant-corresponding gradation value for the target pixel. The colorant-corresponding gradation value for each pixel is defined for a color component corresponding to colorant and representing density of the color component in color of the each pixel. The dot forming condition includes that the target pixel is an edge pixel and that a density index value for the target pixel, which is related to density of the color component in the color of the target pixel that is represented by the colorant-corresponding gradation value, is greater than a threshold value. In a case where a dot forming condition is satisfied, it is determined that a dot is to be formed for the target pixel, irrespective of the colorant-corresponding gradation value.

20 Claims, 8 Drawing Sheets

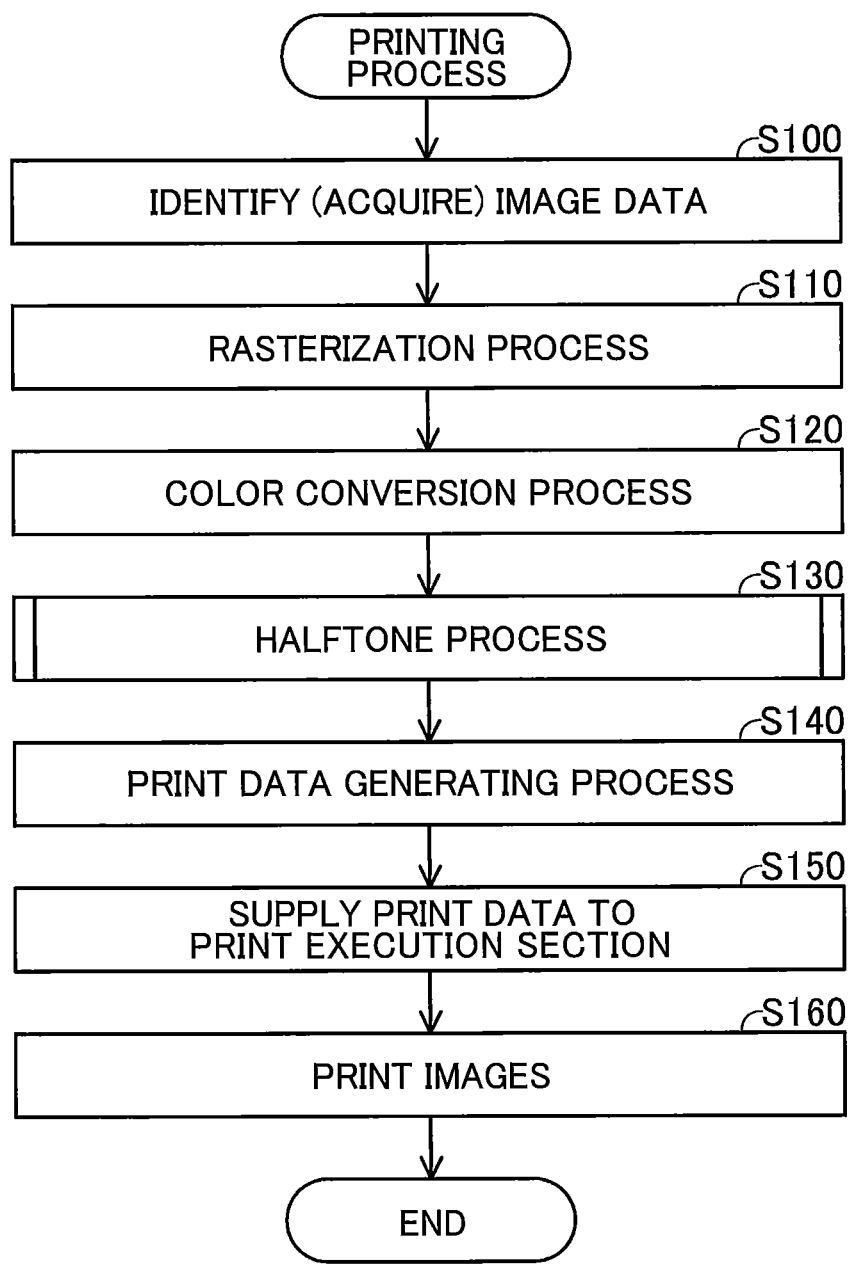

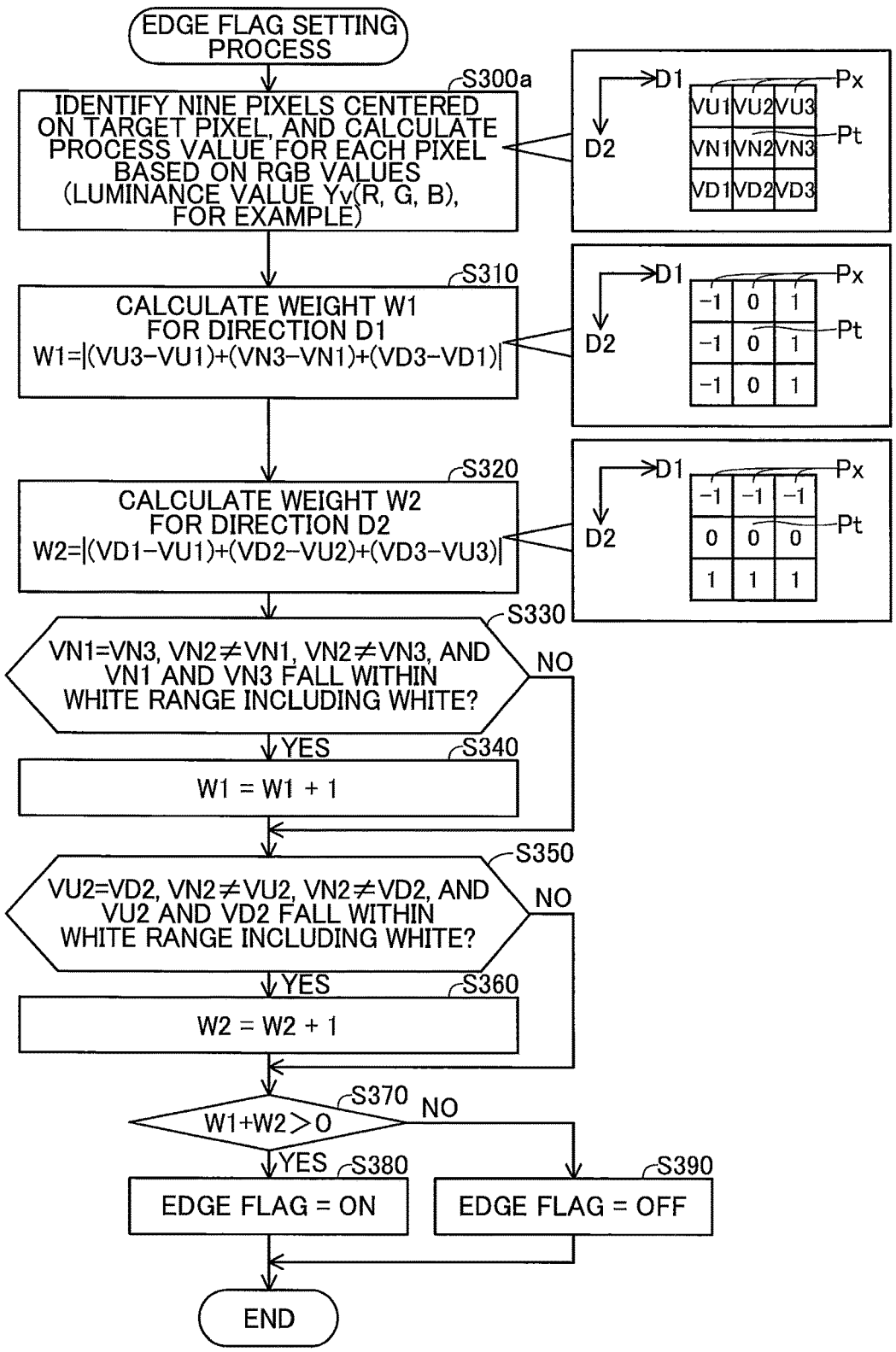

IMAGE PROCESSING APPARATUS THAT EXECUTES HALFTONE PROCESS ON TARGET IMAGE DATA INCLUDING EDGE PIXEL

CROSS REFERENCE TO RELATED APPLICATION

This application claims priority from Japanese Patent Application No. 2016-192903 filed Sep. 30, 2016. The entire content of the priority application is incorporated herein by reference.

TECHNICAL FIELD

The present disclosure relates to an image process for processing an image to be printed.

BACKGROUND

Printers have conventionally been used to print images by recording dots of a colorant, such as ink or toner, on a recording medium. This type of printer can render depth of color through the density of dots. In order to avoid blurred contours of images such as text that can produce indistinct or illegible images, techniques using contour extraction data have been proposed for generating print output data with emphasized contours. To generate contour extraction data, the image data is converted to bi-level data (two-level data) and contour parts are extracted from the bi-level data.

SUMMARY

However, emphasizing contours of text or other image objects using the conventional techniques described above often make the edges of the text and the like too noticeable.

In view of the foregoing, it is an object of the present disclosure to provide a technology that prevents edges of images from becoming too faint and that prevents edges of images from becoming too conspicuous.

According to one aspect, an image processing apparatus includes a controller. The controller is configured to perform:

specifying input image data;

executing a halftone process onto target image data to thereby generate processed data, the target image data being obtained based on the input image data and representing a target image in which a plurality of pixels are arranged, the target image data including a colorant-corresponding gradation value for each of the plurality of pixels, the colorant-corresponding gradation value for each pixel being defined for a color component corresponding to colorant and representing density of the color component in color of the each pixel, the processed data representing a dot formation state for each pixel; and supplying the processed data to a print execution section that is configured to print images by using the colorant, the executing the halftone process including:

judging whether a target pixel among the plurality of pixels is an edge pixel representative of an edge of an object in the target image;

executing a first judgement to determine whether a density index value for the target pixel is greater than a threshold value, the density index value for the target pixel being related to the density of the color component in the color of the target pixel that is represented by the colorant-corresponding gradation value for the target pixel;

in a case where a dot forming condition is not satisfied, executing a first dot formation determination the dot forming condition including a condition that the target pixel is an edge pixel and another condition that the density index value is greater than the threshold value, the first dot formation determination being configured to determine whether to form a dot for the target pixel dependently on the colorant-corresponding gradation value for the target pixel and according to a predetermined method; and in a case where the dot forming condition is satisfied, executing a second dot formation determination to determine that a dot is to be formed for the target pixel, irrespective of the colorant-corresponding gradation value for the target pixel.

According to another aspect, a non-transitory computer readable storage medium stores a set of program instructions for an image processing apparatus. The image processing apparatus includes a processor. The program instructions, when executed by the processor, cause the image processing apparatus to perform:

specifying input image data;

executing a halftone process onto target image data to thereby generate processed data, the target image data being obtained based on the input image data and representing a target image in which a plurality of pixels are arranged, the target image data including a colorant-corresponding gradation value for each of the plurality of pixels, the colorant-corresponding gradation value for each pixel being defined for a color component corresponding to colorant and representing density of the color component in color of the each pixel, the processed data representing a dot formation state for each pixel; and supplying the processed data to a print execution section that is configured to print images by using the colorant, the executing the halftone process including:

judging whether a target pixel among the plurality of pixels is an edge pixel representative of an edge of an object in the target image;

executing a first judgement to determine whether a density index value for the target pixel is greater than a threshold value, the density index value for the target pixel being related to the density of the color component in the color of the target pixel that is represented by the colorant-corresponding gradation value for the target pixel;

in a case where a dot forming condition is not satisfied, executing a first dot formation determination the dot forming condition including a condition that the target pixel is an edge pixel and another condition that the density index value is greater than the threshold value, the first dot formation determination being configured to determine whether to form a dot for the target pixel dependently on the colorant-corresponding gradation value for the target pixel and according to a predetermined method; and in a case where the dot forming condition is satisfied, executing a second dot formation determination to determine that a dot is to be formed for the target pixel, irrespective of the colorant-corresponding gradation value for the target pixel.

According to another aspect, an image processing method includes:

specifying input image data;

executing a halftone process onto target image data to thereby generate processed data, the target image data being obtained based on the input image data and representing a target image in which a plurality of pixels are arranged, the target image data including a colorant-corresponding gradation value for each of the plurality of pixels, the colorant-corresponding gradation value for each pixel being defined for a color component corresponding to colorant and representing density of the color component in color of the each pixel, the processed data representing a dot formation state for each pixel; and supplying the processed data to a print execution section that is configured to print images by using the colorant, the executing the halftone process including:

judging whether a target pixel among the plurality of pixels is an edge pixel representative of an edge of an object in the target image;

executing a first judgement to determine whether a density index value for the target pixel is greater than a threshold value, the density index value for the target pixel being related to the density of the color component in the color of the target pixel that is represented by the colorant-corresponding gradation value for the target pixel;

in a case where a dot forming condition is not satisfied, executing a first dot formation determination the dot forming condition including a condition that the target pixel is an edge pixel and another condition that the density index value is greater than the threshold value, the first dot formation determination being configured to determine whether to form a dot for the target pixel dependently on the colorant-corresponding gradation value for the target pixel and according to a predetermined method; and in a case where the dot forming condition is satisfied, executing a second dot formation determination to determine that a dot is to be formed for the target pixel, irrespective of the colorant-corresponding gradation value for the target pixel.

BRIEF DESCRIPTION OF THE DRAWINGS

The particular features and advantages of the disclosure will become apparent from the following description taken in connection with the accompanying drawings, in which:

FIG. 2 is a flowchart showing a printing process according to the embodiment;

FIG. 8 is a flowchart illustrating steps in the edge flag setting process in FIG. 7.

DETAILED DESCRIPTION

Figure 1:
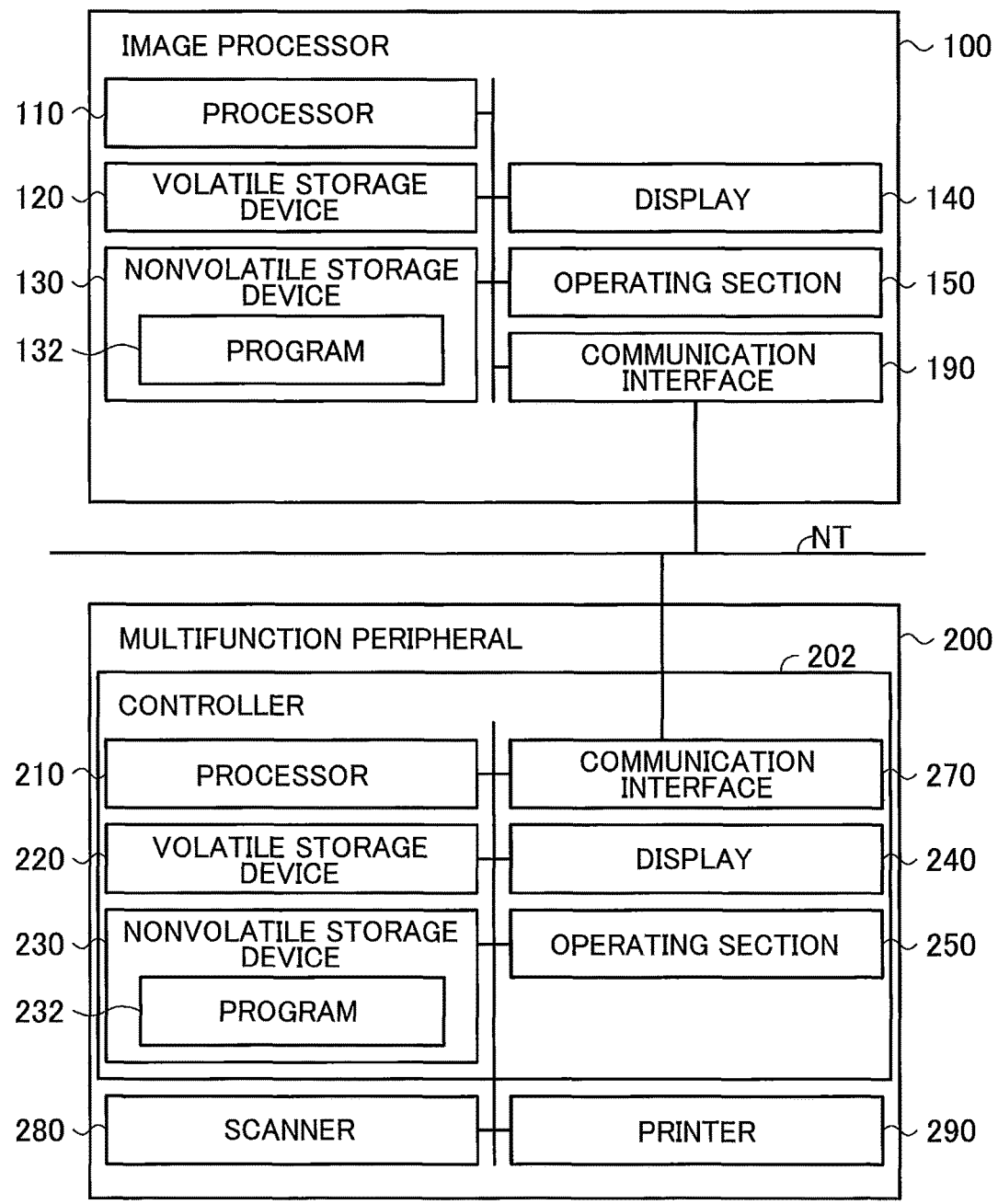
FIG. 1 is a block diagram showing an image-processing system according to an embodiment.

An image processing apparatus according to a first embodiment will be described while referring to the accompanying drawings wherein like parts and components are designated by the same reference numerals to avoid duplicating description.

A. First Embodiment

FIG. 1 is a block diagram showing an image-processing system according to the embodiments. This image-processing system includes an image processor 100, and a multifunction peripheral 200. The image processor 100 and multifunction peripheral 200 are connected to a network NT and are capable of communicating with each other over the network NT.

The image processor 100 is a personal computer, for example, such as a desktop computer or a tablet computer. The image processor 100 has a processor 110, a volatile storage device 120, a nonvolatile storage device 130, a display 140 for displaying images, an operating section 150 for accepting user operations, and a communication interface 190. All of these components are interconnected via a bus.

The processor 110 is a device that performs data processing, such as a CPU. The volatile storage device 120 is configured of DRAM, for example. The nonvolatile storage device 130 is flash memory, for example. The nonvolatile storage device 130 stores a program 132. By executing the program 132, the processor 110 implements a process for controlling the multifunction peripheral 200 to print images (described later in greater detail). The program 132 may be a printer driver, for example. The processor 110 temporarily stores various intermediate data used when executing the program 132 in a storage device, such as the volatile storage device 120 or nonvolatile storage device 130. The program 132 may be supplied by the manufacturer of the multifunction peripheral 200, for example.

The display 140 is a device that displays images, such as a liquid crystal display. The operating section 150 is a device that receives operations inputted by the user, such as a touchscreen superimposed over the display 140. By operating the operating section 150, the user can input various instructions into the image processor 100.

The communication interface 190 is an interface capable of communicating with other devices, such as a USB interface, a wired LAN interface, or the IEEE 802.11 wireless interface. In the embodiment, the communication interface 190 is a wired or wireless network interface that is connected to the network NT.

The multifunction peripheral 200 has a controller 202, a scanner 280, and a printer 290. The controller 202 has a processor 210, a volatile storage device 220, a nonvolatile storage device 230, a display 240 that displays images, an operating section 250 that accepts user operations, and a communication interface 270. All of these components are interconnected via a bus.

The processor 210 is a device that performs data processing, such as a CPU. The volatile storage device 220 is configured of DRAM, for example. The nonvolatile storage device 230 is flash memory, for example. The nonvolatile storage device 230 stores a program 232. By executing the program 232, the processor 210 implements a process for controlling the printer 290 to print an image (described later in greater detail). The processor 210 temporarily stores various intermediate data used when executing the program 232 in a storage device, such as the volatile storage device 220 or nonvolatile storage device 230. In the embodiment, the program 232 may be pre-stored in the nonvolatile storage device 230 as firmware by the manufacturer of the multifunction peripheral 200, for example. However, the multifunction peripheral 200 may be configured to acquire at least a portion of the program 232 from an external device, such as a server, and to store the acquired portion in the nonvolatile storage device 230.

The display 240 is a device that displays images, such as a liquid crystal display. The operating section 250 is a device that accepts operations inputted by the user, such as a touchscreen superimposed over the display 240. By operating the operating section 250, the user can input various instructions into the multifunction peripheral 200.

The communication interface 270 is an interface capable of communicating with other devices, such as a USB interface, a wired LAN interface, or the IEEE 802.11 wireless interface. In the embodiment, the communication interface 270 is a wired or wireless network interface and is connected to the network NT.

The scanner 280 produces scan data representing a read image (hereinafter called a "scanned image") by optically reading a document or other object using a photoelectric conversion element, such as a CCD or CMOS.

The printer 290 prints images on paper (an example of the printing medium) according to a prescribed method (inkjet or laser printing method, for example). In the embodiment, the printer 290 is an inkjet printing device capable of printing color images using ink in the four colors cyan (C), magenta (M), yellow (Y), and black (K).

FIG. 2 is a flowchart showing an example of a printing process. In the embodiment, the processor 110 of the image processor 100 (see FIG. 1) executes the printing process as a printer driver. For example, the processor 110 begins executing this printing process when the user inputs a print command into an application program, such as a document creation program or an image creation program, and the application program calls the printer driver.

In S100 of FIG. 2, the processor 110 identifies input image data that is the target image data for a printing process, and acquires the identified input image data (hereinafter, the input image data will simply be called the "input data"). In the embodiment, the input data that the processor 110 acquires is image data provided by the application program that called the printer driver. For example, the input data may be image data described in a page description language, such as the Enhanced Metafile (EMF) format. Alternatively, the input data may be RGB bitmap data.

In S110 the processor 110 executes a rasterization process on the input data acquired in S100 to generate bitmap data for the printing process. The bitmap data represents a target image that includes a plurality of pixels. Hereinafter, the generated data will be called "first bitmap data." In the embodiment, the first bitmap data is RGB image data expressing a color for each pixel using RGB gradation values. Each of the RGB gradation values in the embodiment is expressed as one of 256 gradations from 0 to 255. The resolution (i.e., the pixel density) of the first bitmap data is set to a resolution suitable for the printing process. When the input data is bitmap data, the processor 110 may execute a process for converting the resolution of the bitmap data to a resolution suitable for printing, to generate the first bitmap data.

Figure 3A:
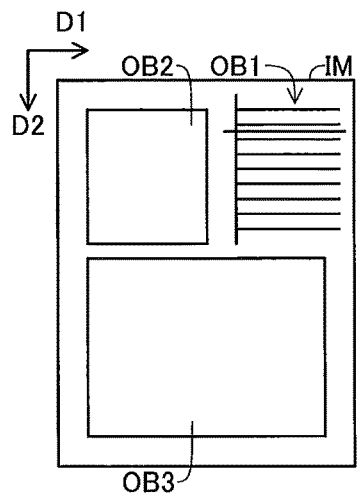
FIG. 3A shows an example of an image represented by first bitmap data.

FIG. 3A shows an example of an image IM represented by the first bitmap data. This image IM is identical to the image represented by the input data. The image IM includes a text object OB1, an illustration object OB2, and a photograph object OB3 arranged on a white background. While not shown in the drawing, the image IM is configured of a plurality of pixels arranged in a grid that has a first direction D1, and a second direction D2 orthogonal to the first direction D1. In the following description, the first direction D1 will also be called the rightward direction, and the direction opposite the first direction D1 will be called the leftward direction. Further, the second direction D2 will also be called the downward direction, and the direction opposite the second direction D2 will be called the upward direction.

Figure 3B:
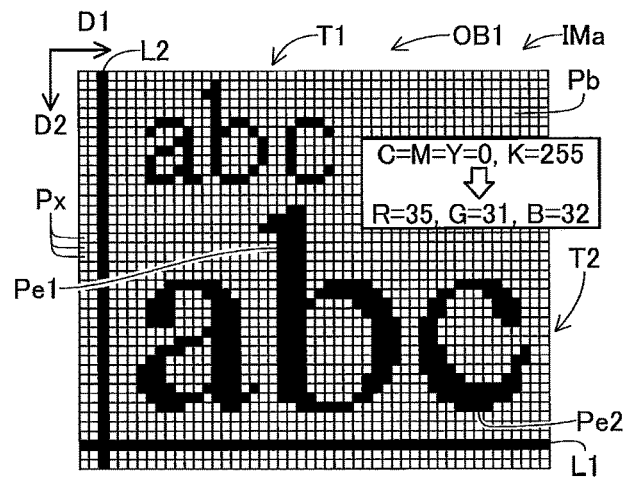
FIG. 3B is an enlarged view showing a portion of a text object in the image shown in FIG. 3A.

FIG. 3B is an enlarged view showing a portion of the text object OB1 (hereinafter called a "partial image IMa"). The partial image IMa is rendered as a plurality of small squares Px representing pixels (hereinafter called pixels Px). The text object OB1 includes a relatively small character string T1, a relatively large character string T2, a first line L1 extending in the first direction D1, and a second line L2 extending in the second direction D2. Each of the lines L1 and L2 has a width of one pixel.

The box in the upper right of FIG. 3B provides sample gradation values for pixels Px representing the character strings T1 and T2 and pixels Px representing the lines L1 and L2. The gradation values are indicated in both CMYK values and RGB values. In the embodiment, each of the CMYK gradation values represents a quantity per unit area of the corresponding colorant and is expressed as one of 256 gradations from 0 to 255. When the image processor 100 is printing an image using image data expressed in the CMYK color space, the operating system may convert the CMYK gradation values to RGB gradation values. Specifically, the image processor 100 may have a preset color space (hereinafter called the "reference color space") that the operating system uses for image processing required when displaying or printing image data. The reference color space in the embodiment is the RGB color space. When the color space of the image data used in image processing differs from the reference color space, the operating system converts the image data to data in the reference color space in order to perform image processing. For example, when printing an image based on image data expressed in the CMYK color space, the operating system converts the image data from data in the CMYK color space to data in the RGB color space. Subsequently, the image-processing application running on the operating system supplies the converted image data to the printer driver as input data. The operating system may use predetermined color correspondences (e.g., a display ICC profile) mapping gradation values in the original color space (the CMYK color space in this example) to gradation values in the reference color space (the RGB color space in this example).

In the example of FIG. 3B, the CMYK gradation values C=M=Y=0 and K=255 are converted to the RGB gradation values R=35, G=31, and B=32. The black gradation value K is the maximum value in the range of possible gradations (from 0 to 255), while the cyan, magenta, and yellow gradation values C, M, and Y are the minimum values in the allowable range. This combination of the CMYK gradation values (C=M=Y=0 and K=255) render black which is the darkest color within the entire CMYK color range defined by all the possible CMYK gradation values. On the other hand, the red, green, and blue gradation values R, G, and B are all greater than 0, which is the minimum value in the RGB color range defined by all the possible RGB gradation values. These RGB gradation values render a gray tone that is brighter than black. Thus, conversion between color spaces can result in the color of an object being converted from black to gray.

In S120 of FIG. 2, the processor 110 executes a color conversion process on the first bitmap data to generate image data expressed in the color space corresponding to the types of colorant used in printing. In the embodiment, the processor 110 generates second bitmap data in the CMYK color space from the first bitmap data in the RGB color space. The color conversion process is performed using a lookup table that defines correlations between RGB gradation values and CMYK gradation values. The lookup table used in this embodiment has been prepared by the manufacturer of the multifunction peripheral 200 (see FIG. 1) such that the total of the CMYK gradation values in each CMYK combination in the lookup table is limited not to exceed 180% of the maximum gradation value of 255, that is, 459, in order to prevent blurring of ink. The manufacturer of the multifunction peripheral 200 supplies this lookup table together with the program 132 (not shown in the flowchart).

Since the second bitmap data is acquired using the first bitmap data and the first bitmap data is acquired using the input data, the second bitmap data is data acquired using the input data. Therefore, the CMYK gradation values represented by the second bitmap data render colors expressed by the input data (and particularly the quantities, i.e., densities, of the colorants).

In S130 the processor 110 executes a halftone process on the CMYK gradation values in the second bitmap data to generate dot data for each pixel indicating whether a dot is to be formed (hereinafter called the "dot formation state") and the type of ink to be used. Hence, the second bitmap data is the image data subjected to the halftone process (hereinafter called the "target image data" or simply the "target data"). In the embodiment, the halftone process is implemented using a dither matrix. As will be described later, the processor 110 sets the dot formation state for pixels representing the edges of objects, such as the character strings T1 and T2, or pixels representing thin lines, such as the lines L1 and L2, to indicate that a dot is to be formed irrespective of the gradation values. Through this halftone process, the processor 110 generates dot data from second bitmap data in the CMYK color space.

In S140 the processor 110 generates print data based on the dot data generated in S130. The print data is expressed in a data format that the printer 290 of the multifunction peripheral 200 can interpret. For example, the processor 110 generates print data by arranging dot data in the order to be used in printing and by adding various printer control codes and data identification codes to the dot data.

In S150 the processor 110 supplies the print data generated in S140 to the multifunction peripheral 200, which is an example of a print execution section. In S160 the processor 210 of the multifunction peripheral 200 controls the printer 290 to print images based on the print data received in S150. This completes the printing process of FIG. 2.

Figure 4:
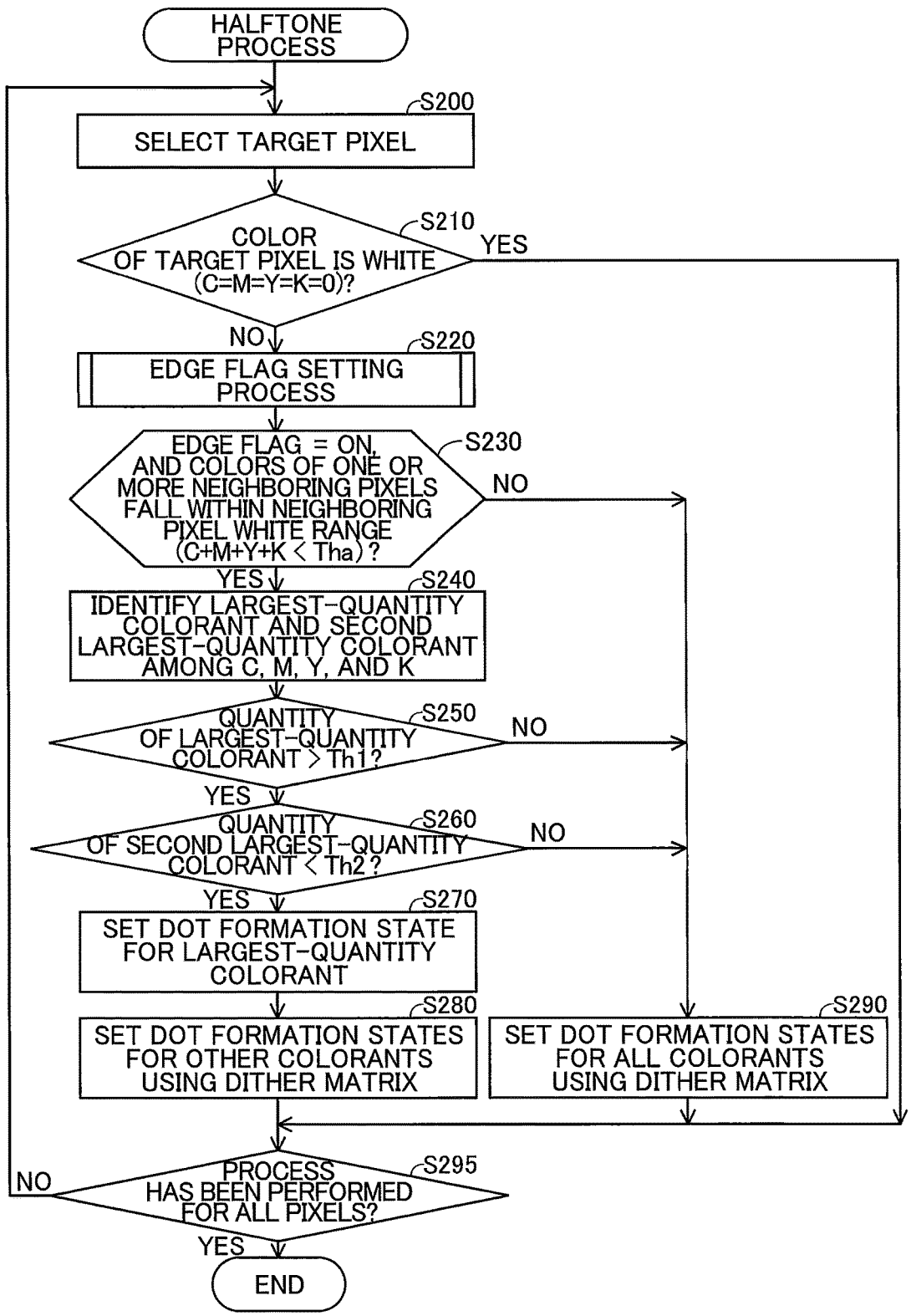
FIG. 4 is a flowchart showing steps in a halftone process in FIG. 2.

FIG. 4 is a flowchart showing steps in a sample halftone process (S130 of FIG. 2). In S200 the processor 110 selects one unprocessed pixel, from among the plurality of pixels represented by the second bitmap data, and sets the selected pixel as a target pixel, i.e., a pixel being processed. In S210 the processor 110 determines whether color of the target pixel is white. It is noted that white is the brightest color among all the colors defined by all the possible CMYK gradation values. In other words, white is the brightest color within the entire CMYK color range of the CMYK color space. In the embodiment, the processor 110 determines that the color of the target pixel is white when all CMYK values are 0. If the target pixel is white (S210: YES), the processor 210 advances to S295 without setting the dot formation state of the target pixel to indicate that a dot is to be formed. The processor 110 reaches a YES determination in S210 when the target pixel represents the background, and reaches a NO determination in S210 when the target pixel represents an object.

If the target pixel has a color different from white (S210: NO), in S220 the processor 110 executes a process for setting an edge flag (hereinafter called the "edge flag setting process"). The edge flag setting process is performed to determine whether the target pixel represents the edge of an object.

Figure 5:
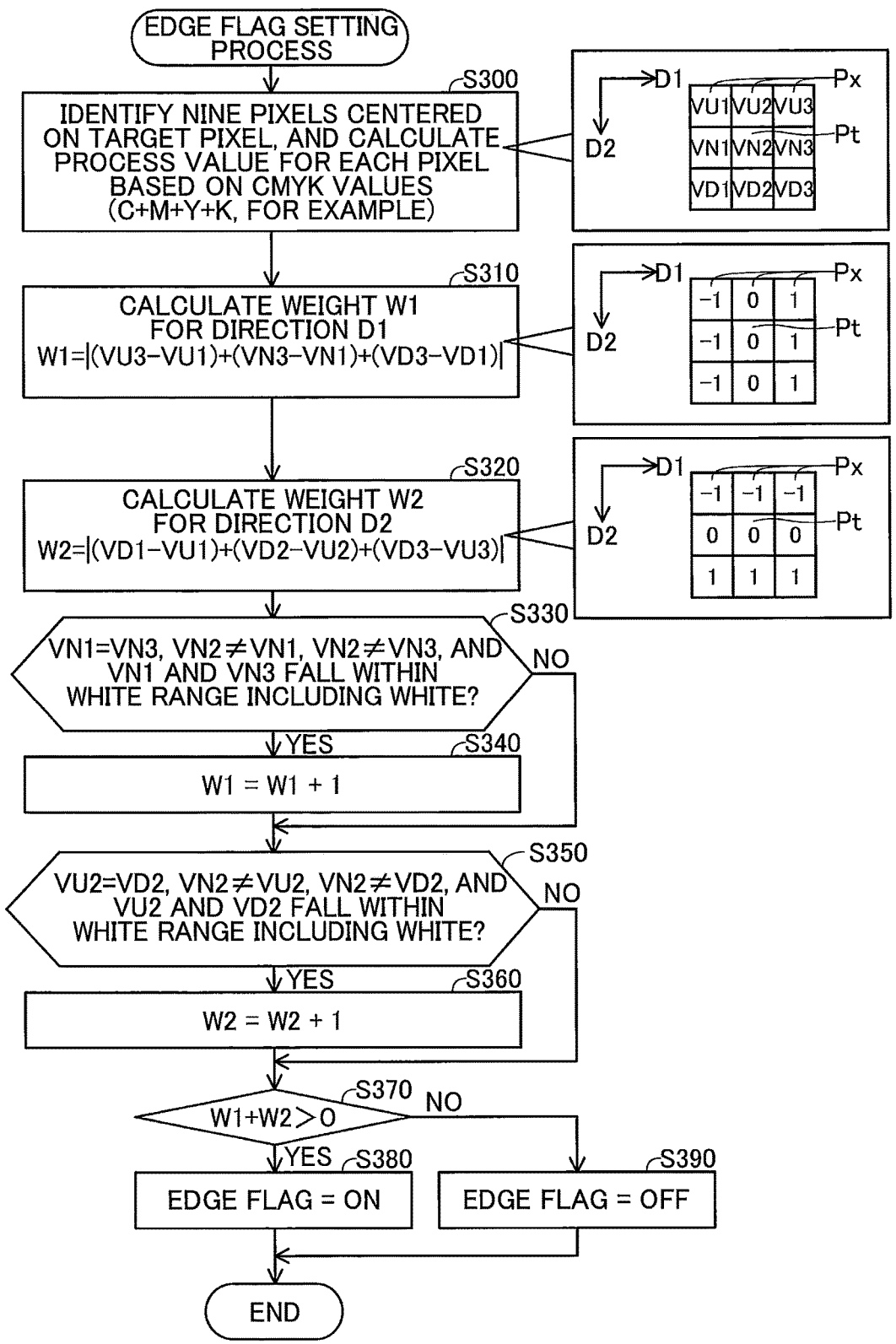
FIG. 5 is a flowchart illustrating steps in an edge flag setting process in FIG. 4.

FIG. 5 is a flowchart illustrating steps in the edge flag setting process. In S300 of FIG. 5, the processor 110 identifies nine pixels forming a 3×3 pixel block that is centered on the target pixel. Nine pixels Px centered on a target pixel Pt are shown to the right of step S300 in FIG. 5. The nine pixels Px are arranged in a square with three pixels Px in each row aligned in the first direction D1 and three pixels Px in each column aligned in the second direction D2. The processor 110 calculates a process value for each of the nine pixels Px. The process values are gradation values for use in the edge flag setting process. In the embodiment, each process value is the sum of all CMYK gradation values. Thus, a larger process value denotes a higher density, and a change in the process value represents a change in color.

The symbols provided in the pixels Px of FIG. 5 denote reference symbols for the process values. Each reference symbol is configured of two alphabetic characters denoting the pixel position in the second direction D2, and a single numeric character representing the position of the pixel in the first direction D1. The characters "VU", "VN", and "VD" are assigned to the three pixel positions in each column extending in the second direction D2 in sequence along the second direction D2. The numbers "1", "2", and "3" are assigned to the three pixel positions in each row extending in the first direction D1 in sequence along the first direction D1. As an example, the reference symbol for the process value of the target pixel Pt is "VN2".

In S310 the processor 110 calculates a first weight W1 for the first direction D1. The first weight W1 denotes the magnitude of difference in process values between pixels on the side of the target pixel Pt in the rightward direction and pixels on the side of the target pixel Pt in the leftward direction. A large first weight W1 indicates a high probability that the target pixel Pt represents an edge. This type of weight W1 is called an edge quantity, or edge strength. Various edge detection filters can be used to calculate the first weight W1. An edge detection filter used in S310 of the embodiment is shown to the right of step S310 in FIG. 5. The values in the pixels Px denote coefficients applied to the corresponding process values. A coefficient is set for each pixel position in the first direction D1. Specifically, coefficients "−1", "0", and "1" are assigned to the three pixel positions in each row and arranged in sequence along the first direction D1. The first weight W1 is the absolute value of the weighted sum of process values for the nine pixels Px centered on the target pixel Pt. The coefficients in this edge detection filter are used as weights.

A pixel Pe1 in FIG. 3B represents part of the left edge of a character included in the character string T2 (the character "b" in this example). When the pixel Pe1 is the target pixel, the first weight W1 is a large value (a value greater than 0, for example). The first weight W1 is similarly a large value for pixels representing parts of the right edge of the character. When a pixel representing a part of the background separated from objects such as text (pixel Pb in FIG. 3B, for example), the first weight W1 is a small value (0, for example).

In S320 the processor 110 calculates a second weight W2 for the second direction D2. As with the first weight W1, the second weight W2 also represents an edge quantity. However, unlike the first weight W1, the second weight W2 denotes the magnitude of difference in process values between pixels on the side of the target pixel Pt in the downward direction and pixels on the side of the target pixel Pt in the upward direction. An edge detection filter used in S320 of the embodiment is shown to the right of step S320 in FIG. 5. Coefficients "−1", "0", and "1" are assigned to the three pixel positions in the second direction D2 and arranged in sequence along the second direction D2. The second weight W2 is the absolute value of the weighted sum of process values for the nine pixels Px centered on the target pixel Pt. The coefficients in this edge detection filter are used as weights.

A pixel Pe2 in FIG. 3B represents part of the bottom edge of a character included in the character string T2 (the character "c" in this example). When the pixel Pe2 is the target pixel, the second weight W2 is a large value (a value greater than 0, for example). The second weight W2 is similarly large for pixels representing parts of the top edge of the character. When a pixel representing part of the background separated from text or other objects (pixel Pb, for example) is the target pixel, the second weight W2 is a small value (0, for example).

Note that the characters in the character string T1 and the lines L1 and L2 in FIG. 3B are rendered with thin lines having one pixel in width. Consequently, the weights W1 and W2 may indicate small values (0, for example) when a pixel representing a thin line is set as the target pixel. It is difficult to calculate a large edge quantity for pixels representing thin lines, not only when using the detection edge filter of the embodiment, but when using any other common edge detection filter, such as a Sobel filter. Therefore, in the embodiment, the process of S330-S360 described below is performed to acquire larger weights W1 and W2 for pixels representing thin lines that are one pixel in width (hereinafter called "thin-line pixels").

In S330 the processor 110 determines whether the target pixel Pt is a candidate for a pixel that represents a thin line extending in the second direction D2, such as the second line L2 in FIG. 3B. To make this determination in the embodiment, the processor 110 determines whether the following conditions 1-3 are met.

Condition 1) The difference between the process value VN3 for the pixel adjacent to the target pixel Pt in the rightward direction and the process value VN1 for the pixel adjacent to the target pixel Pt in the leftward direction is 0 (i.e., VN1=VN3).

Condition 2) The process value VN2 for the target pixel Pt differs from both process values VN1 and VN3 of the neighboring pixels.

Condition 3) The process values VN1 and VN3 for both neighboring pixels fall within a white range, where the white range is a partial color range that includes white. More specifically, the white range is a part of the entire color range defined by all the possible process values. The white range contains white. White is the brightest color within the entire color range. In other words, the process value corresponding to white (0 in this example) is the highest value of brightness among all the possible process values (0 to 459 in this example). The white range used in this process may be the range of process values higher than or equal to zero (0) and less than a predetermined threshold value (90, for example).

Conditions 1-3 set forth above are met when the pixel adjacent to the target pixel Pt in the rightward direction and the pixel adjacent to the target pixel Pt in the leftward direction represent white (i.e., the background), and the target pixel Pt represents a color other than the background. When the target pixel Pt is a pixel representing part of the second line L2 in FIG. 3B, for example, all three conditions 1-3 are satisfied. When all conditions 1-3 are satisfied, the target pixel is a candidate for a thin-line pixel. Note that the target pixel may represent part of an image other than a thin line having a width of one pixel, even when all conditions 1-3 are satisfied.

When all conditions 1-3 are met (S330: YES), in S340 the processor 110 adds 1 to the first weight W1 and advances to S350. Thus, when all three conditions 1-3 are satisfied, the processor 110 determines that the target pixel is a candidate for a thin-line pixel and adjusts the first weight W1 to a larger value. When even one of the conditions 1-3 is not satisfied (S330: NO), the processor 110 skips S340 and advances directly to S350.

In S350 the processor 110 determines whether the target pixel Pt is a pixel that represents a thin line extending in the first direction D1, such as the first line L1 in FIG. 3B. To make this determination in the embodiment, the processor 110 determines whether the following conditions 11-13 are satisfied.

Condition 11) The difference between the process value VD2 for the pixel adjacent to the target pixel Pt in the downward direction and the process value VU2 for the pixel adjacent to the target pixel Pt in the upward direction is 0 (i.e., VU2=VD2).

Condition 12) The process value VN2 for the target pixel Pt differs from the process values VU2 and VD2 of both neighboring pixels.

Condition 13) The process values VU2 and VD2 for both neighboring pixels fall within a white range that is equivalent to the white range in condition 3 of S330.

Conditions 11-13 are satisfied when the pixel adjacent to the target pixel Pt in the downward direction and the pixel adjacent to the target pixel Pt in the upward direction represent white (i.e., the background), and the target pixel Pt represents a color different from the background. All conditions 11-13 are satisfied when the target pixel Pt is a pixel representing the first line L1 in FIG. 3B, for example. When all conditions 11-13 are satisfied, the target pixel is a candidate for a thin-line pixel.

When all conditions 11-13 are satisfied (S350: YES), in S360 the processor 110 adds 1 to the second weight W2 and advances to S370. Thus, when all conditions 11-13 are met, the processor 110 determines that the target pixel is a candidate for a thin-line pixel and adjusts the second weight W2 to a larger value. When even one of the conditions 11-13 is not satisfied (S350: NO), the processor 110 skips S360 and advances directly to S370.

In S370 the processor 110 determines whether the sum of weights W1 and W2 is greater than 0. A sum greater than 0 may be calculated when the target pixel Pt represents part of a thin line having a width of one pixel or the edge of an object. A pixel representing a thin line of one pixel in width may be considered a pixel representing the edge of a thin line. When the sum of weights is greater than 0 (S370: YES), in S380 the processor 110 sets the edge flag to ON and subsequently ends the process of FIG. 5 (i.e., S220 of FIG. 4). If the sum of weights is 0 (S370: NO), in S390 the processor 110 sets the edge flag to OFF and subsequently ends the process of FIG. 5. In this way, the process of FIG. 5 serves to determine whether the target pixel Pt represents an edge, and the edge flag is set to represent the result of this determination.

In S230 of FIG. 4, the processor 110 determines whether two conditions are met: that the edge flag is ON, and that the colors of one or more neighboring pixels among the four pixels neighboring the target pixel Pt fall within a predetermined neighboring-pixel white range. The four neighboring pixels are the pixels adjacent to the target pixel Pt in the upward, downward, leftward, and rightward directions. The neighboring-pixel white range is a partial color range that includes white. More specifically, the neighboring-pixel white range is a part of the entire CMYK color range that is defined by all the possible CMYK gradation values. The neighboring-pixel white range contains white, wherein white is the brightest color in the entire CMYK color range. In the embodiment, the processor 110 uses the sum of the CMYK gradation values to determine whether the colors of the neighboring pixels fall within the neighboring-pixel white range. The sum of the CMYK gradation values corresponding to white is the highest value of brightness (0 in this example) among all the possible sums of the CMYK gradation values (0 to 459, in this example). Accordingly, the neighboring-pixel white range used in this example is a color range in which the sums of CMYK gradation values are greater than or equal to zero (0) and less than a threshold Tha. For example, the threshold Tha may be a value approximately 20% of the maximum value among all the possible sums of the CMYK gradation values (90 (=459×20%), in this example), and therefore the neighboring-pixel white range may be such a color range in which the sums of CMYK gradation values are greater than or equal to zero (0) and less than 90. If the colors of all four neighboring pixels fall outside the neighboring-pixel white range, the target pixel could be surrounded by pixels representing an object rather than the background. For example, the target pixel may represent an inner part of an object, such as a photograph.

Thus, the processor 110 reaches a NO determination in S230 when the target pixel represents an inner part rather than an edge of the object. The processor 110 reaches a NO determination in S230 also when the edge flag is OFF. In these cases (S230: NO), the processor 110 advances to S290 and sets the dot formation states for all colorants of the target pixel using the gradation values corresponding to the colorants (the CMYK gradation values in this case) and a dither matrix. Subsequently, the processor 110 advances to S295.

The following is one example of a process performed using a dither matrix. The processor 110 determines that a cyan dot is to be formed when the gradation value for cyan is greater than or equal to the threshold value for the target pixel Pt set in the dither matrix and determines that a cyan dot is not to be formed when the gradation value for cyan is smaller than the threshold value. Note that the processor 110 may also determine that a cyan dot is not to be formed when the gradation value for cyan is equivalent to the threshold value. The processor 110 further determines the dot formation states for the other colorants based on comparisons of the gradation values for color components corresponding to these other colorants and the threshold values. Note that the dither matrix is configured to have different threshold values for each colorant, but a universal dither matrix may be used for all colorants instead.

When the processor 110 reaches a YES determination in S230, in S240 the processor 110 identifies the colorant corresponding to the largest gradation value among the CMYK gradation values (hereinafter called the "largest-quantity colorant") and the colorant corresponding to the second largest gradation value (hereinafter called the "second largest-quantity colorant"). For example, when the target pixel represents an object having a near-black color, such as the character strings T1 and T2 or the lines L1 and L2 in FIG. 3B, the largest-quantity colorant is likely black. Even when the target pixel represents an object of another color, the largest-quantity colorant is the colorant nearest in color to the object color.

In S250, the processor 110 determines whether the quantity of the largest-quantity colorant (i.e., the gradation value) is greater than a first threshold Th1. The first threshold Th1 may be a value approximately 80% of the maximum value (maximum quantity of colorant) in the range of possible gradation values (204, for example). Since the gradation value of the largest-quantity colorant is the largest quantity among quantities of colorants for the target pixel, a larger gradation value for the largest-quantity colorant indicates a higher density of the target pixel. Thus, the gradation value for the largest-quantity colorant is an example of an index related to the density of the target pixel, wherein the density of the target pixel is represented by the CMYK gradation values of the target pixel. Hence, when the gradation value of the largest-quantity colorant is greater than the first threshold Th1, the density of the largest-quantity colorant is greater than a density corresponding to the first threshold Th1. When the gradation value of the largest-quantity colorant is no greater than the first threshold Th1 (S250: NO), the processor 110 advances to S290, sets the dot formation states for all colorants at the target pixel using the dither matrix, and advances to S295.

When the gradation value for the largest-quantity colorant is greater than the first threshold Th1 (S250: YES), in S260 the processor 110 determines whether the quantity (i.e., the gradation value) of the second largest-quantity colorant is less than a second threshold Th2. The second threshold Th2 is set to a value smaller than the first threshold Th1. That is, the second threshold Th2 may be a value of approximately 30% the maximum value (maximum quantity of colorant) within the range of possible gradation values (77, for example). When the quantity of the second largest-quantity colorant is greater than or equal to the second threshold Th2 (S260: NO), the processor 110 advances to S290, sets the dot formation states for all colorants at the target pixel using the dither matrix, and advances to S295.

When the quantity of the second largest-quantity colorant is less than the second threshold Th2 (S260: YES), in S270 the processor 110 sets the dot formation state to indicate that a dot is to be formed in the largest-quantity colorant. The dot of the largest-quantity colorant is a dot of the colorant nearest in color to the color of the object represented by the target pixel. In S280 the processor 110 sets the dot formation states for the remaining colorants, excluding the largest-quantity colorant, using the dither matrix. This process for setting dot formation states using the dither matrix is identical to the process in S290. Subsequently, the processor 110 advances to S295.

In S295 the processor 110 determines whether the above process has been performed for all pixels. When there remain any unprocessed pixels (S295: NO), the processor 110 returns to S200 and repeats the process for the next unprocessed pixel. Once the process has been completed for all pixels (S295: YES), the processor 110 ends the process of FIG. 4.

Figure 3C:
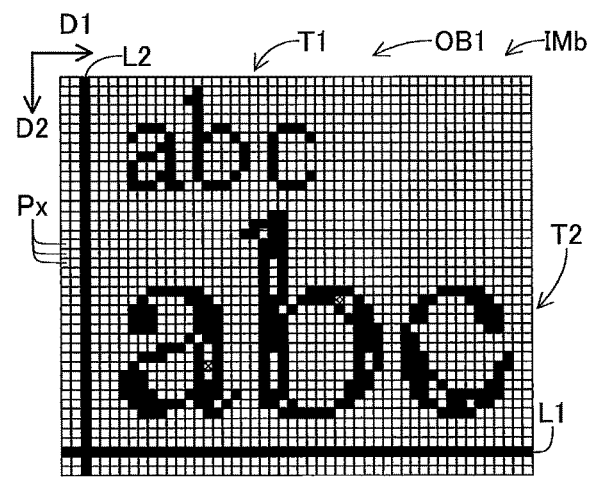
FIG. 3C is a schematic diagram showing an example of an image represented by dot data set in the halftone process of FIG. 4.
Figure 3D:
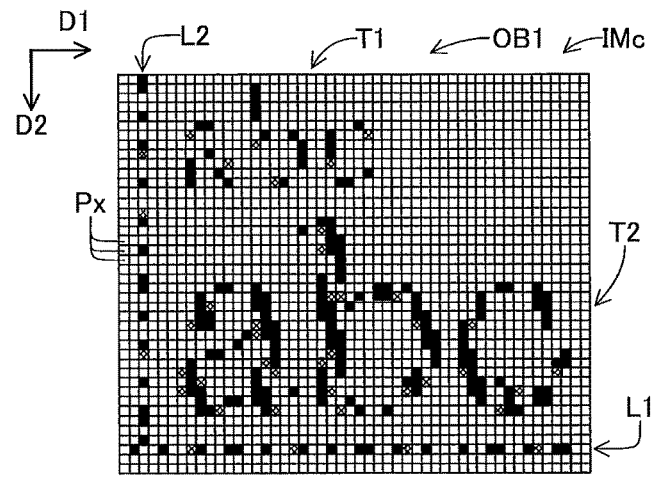
FIG. 3D is a schematic diagram showing an example of an image represented by dot data in a comparative example.

FIG. 3C is a schematic diagram showing a sample image represented by dot data set in the halftone process of FIG. 4 (hereinafter called the "dot image IMb"). FIG. 3D is a schematic diagram showing a sample image represented by dot data in a comparative example in which edge flags are not used and the dot formation states for all colorants at all pixels are set using the dither matrix (hereinafter called a "comparative dot image IMc"). The dot images IMb and IMc in FIGS. 3C and 3D, respectively, show the same area of the image corresponding to the partial image IMa in FIG. 3B. White pixels Px in these drawings indicate pixels without dots, while black pixels Px denote pixels having at least black dots. Pixels Px with shading denote pixels having at least one of the cyan, magenta, and yellow dots, but no black dots.

As shown in FIG. 3C, pixels Px with no dots and pixels Px with one or more of the cyan, magenta, and yellow dots but no black dots are produced in areas representing characters in the character string T2 that are inside the edges. These pixels Px are produced because the original color of the black characters in the character string T2 are changed to a different color (a gray that is brighter than black in this case) when converting the colors to the reference color space for the printing process, as described with reference to FIG. 3B. In S120 of FIG. 2, the RGB gradation values shown in FIG. 3B are converted to CMYK gradation values. The CMYK gradation values produced from this conversion render gray pixels but are brighter than black. Hence, the gradation value for black is smaller than 255, and the gradation values for cyan, magenta, and yellow are larger than 0. Consequently, gradation values for black may be smaller than the threshold value in the dither matrix, while one or more gradation values for cyan, magenta, and yellow may be larger than the threshold value in the dither matrix.

As shown in FIG. 3C, the pixels Px representing the edges of characters in the character strings T1 and T2 and the pixels Px representing the lines L1 and L2 have black dots. The following is the reason that such dot data was acquired. As described in FIGS. 5 and 3B, an edge flag is set to ON when the target pixel Pt represents the edge of an object or a thin line having a width of one pixel. In S270 of the process described in FIG. 4, the processor 110 determines that a dot is to be formed at the target pixel for the largest-quantity colorant, irrespective of the gradation value for the largest-quantity colorant, when conditions including the following two conditions are met: the edge flag is set to ON (S230: YES); and the gradation value of the largest-quantity colorant is greater than the first threshold Th1 (S250: YES). Hereinafter, these conditions for executing step S270 will be called the dot forming conditions. Since dots are formed at pixels representing edges of objects in dark colors (text or thin lines, for example) irrespective of the gradation value of the largest-quantity colorant, the process described above prevents edges from becoming faint. Further, this method can suitably print thin lines having a width of one pixel. In addition, since the processor 110 determines in S290 whether to form dots in each colorant based on the gradation value corresponding to the colorant at pixels representing the edges of objects having light colors (S250: NO), this method prevents edges from becoming too conspicuous.

In the comparative dot image IMc of FIG. 3D on the other hand, dot formation is determined using a dither matrix for all colorants at all pixels Px. In this case, dots are not formed for a plurality of pixels representing parts of the edges of large characters in the character string T2, for example. Consequently, the edges of large characters may become too faint. Further, dots are not formed for a plurality of pixels representing parts of small characters in the character string T1. Dots are also not formed at a plurality of pixels representing parts of the lines L1 and L2. As a consequence, small characters and thin lines may become indistinct and illegible. The method according to the embodiment avoids these problems.

As described in S250 of FIG. 4, the dot forming conditions for determining whether a dot is to be formed in S270 include the condition that the gradation value representing the quantity of the largest-quantity colorant, serving as a sample index related to the density of the target pixel, is greater than the first threshold Th1. In this way, the processor 110 can suitably determine whether a dot is to be formed at the target pixel by determining whether the condition is met based on a value appropriate for the color of the target pixel. Hence, when the pixel represents the edge of a light-colored object, for example (S250: NO), the processor 110 determines in S290 the dot formation state for each colorant based on the corresponding gradation value rather than executing step S270, thereby preventing the edges from becoming too noticeable.

Further, as described in S260 of FIG. 4, the dot forming conditions for executing step S270 include the condition that the second largest gradation value among the gradation values for all colorants be less than the second threshold Th2. Subsequently, in S270 the processor 110 sets the dot formation state for the largest-quantity colorant to indicate a dot is to be formed. Accordingly, by forming dots with the largest-quantity colorant when the color of the target pixel is close to the color of the largest-quantity colorant, the method of the embodiment can prevent object edges from appearing too unnatural. If the second largest gradation value is greater than the second threshold Th2 despite the edge flag being set to ON (S260: NO), in S290 the processor 110 determines the dot formation state for each colorant based on the corresponding gradation value. Accordingly, the method of the embodiment can prevent edges from becoming too conspicuous. Further, when the second largest gradation value is greater than the second threshold Th2, the processor 110 can determine the dot formation state for the second largest-quantity colorant by comparing the second largest gradation value to a threshold value in the dither matrix. In this way, a dot in the second largest-quantity colorant can be formed, even when a dot in the largest-quantity color is not, on the edge of such an object that is represented by at least predetermined quantities of two or more colorants. Accordingly, the method of the embodiment can prevent the edges of objects from becoming faint, even when the processor 110 does not set the dot formation state in S270 to indicate that a dot is to be formed but determines dot formation states in S290 instead.

Further, when the dot forming conditions for executing S270 of FIG. 4 are satisfied, in S280 the processor 110 sets dot formation states for all colorants other than the largest-quantity colorant according to the same method used in S290 when the dot forming conditions are not met. As described above, in S290 the processor 110 sets the dot formation state for each colorant based on the corresponding gradation value. Accordingly, since this method avoids setting dot formation states unnaturally, the processor 110 can prevent edges and thin lines from becoming too conspicuous.

As described in S210 of FIG. 4, the dot forming conditions for executing step S270 include the condition that the color of the target pixel be non-white. This condition can prevent the processor 110 from executing the process in S270 (the process for setting a dot to be formed in the largest-quantity colorant for the target pixel irrespective of the gradation value of the largest-quantity colorant) for a target pixel representing a color approaching white (for example, a target pixel representing the background or a target pixel representing the edge of a light-colored object). Thus, this method prevents edges from becoming too conspicuous. Further, since this method avoids executing the process in S270 for pixels that represent the background and are adjacent to the edge of an object, the method can prevent objects from being expanded.

As described in S230 of FIG. 4, the dot forming conditions for executing step S270 include the condition that the color of at least one of the four pixels neighboring the target pixel on four sides falls in the neighboring-pixel white range, which is a partial color range that includes white, wherein white is the brightest color in the entire CMYK color range. Accordingly, the dot forming conditions are easily satisfied when the target pixel represents an edge neighboring the background, enabling dots to be formed appropriately at edges (S270). Hence, this method prevents edges from becoming too faint. Further, the dot forming conditions are not easily satisfied when the target pixel represents the interior of an object, such as a photograph, thereby preventing colors within an object from appearing unnatural.

Further, when the dot forming conditions are not satisfied, in S290 the processor 110 determines whether dots are to be formed or not to be formed using the gradation values corresponding to the colorants and a dither matrix. Therefore, the processor 110 can implement dot formation appropriate for the gradation values.

As described in S330 and S350 of FIG. 5, the processor 110 identifies a first pixel adjacent to the target pixel and a second pixel adjacent to the target pixel on the side opposite the first pixel. When thin-line conditions are satisfied, the processor 110 determines that the target pixel is a candidate for a thin-line pixel and updates the weight W1 or W2 to a larger value. The thin-line conditions are configured of conditions 1-3 in S330 described above and conditions 11-13 in S350. In this way, the processor 110 can suitably identify candidates for thin-line pixels.

As described in S300 of FIG. 5, the process value for each pixel is a value obtained based on the gradation value corresponding to each colorant (and specifically, is equivalent to C+M+Y+K). Hence, the processor 110 can suitably identify candidates for thin-line pixels using the gradation values corresponding to the colorants.

B. Second Embodiment

Figure 6:
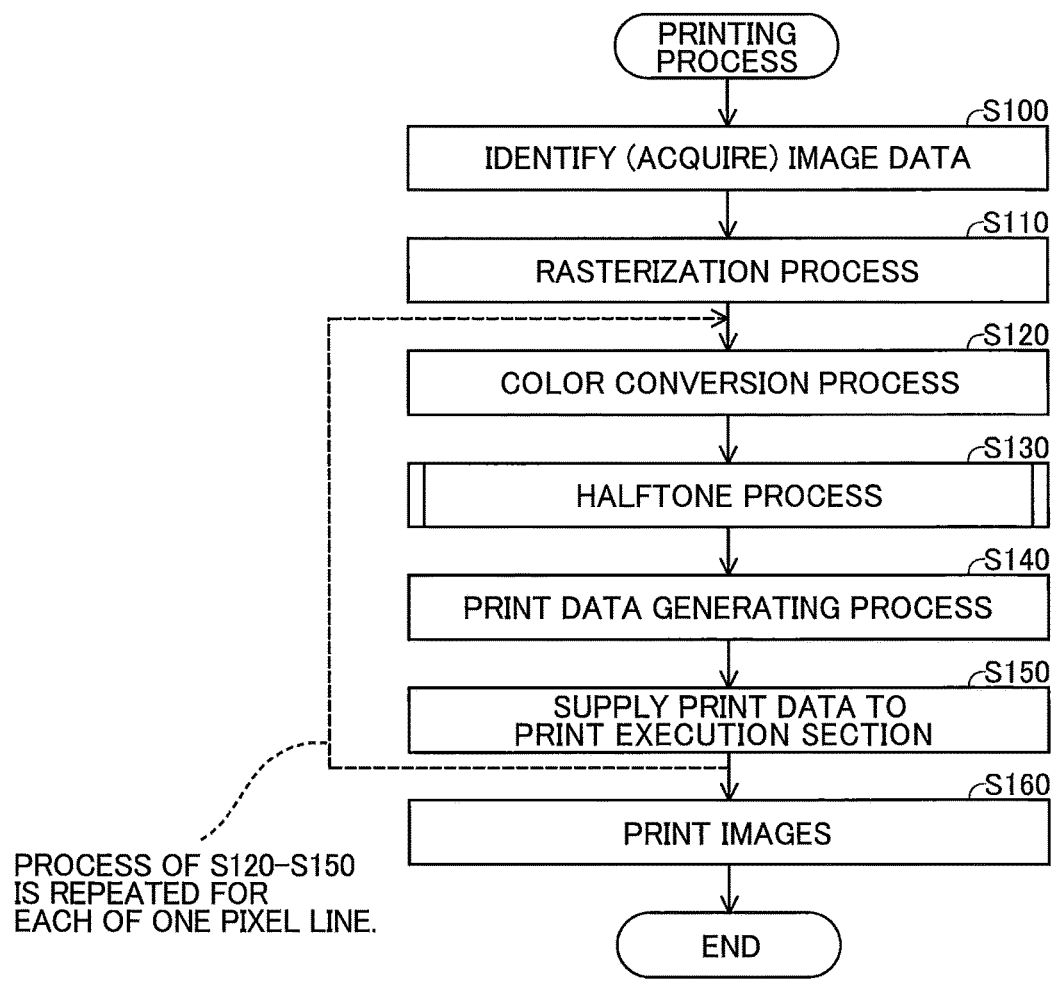
FIG. 6 is a flowchart showing the printing process according to a second embodiment.

FIG. 6 is a flowchart showing the printing process according to a second embodiment. The printing process according to the second embodiment differs from the first embodiment shown in FIG. 2 in that the process of S120-S150 is repeated for each of a prescribed number of pixel lines (lines extending in the first direction D1, for example) among the plurality of pixel lines represented by the first bitmap data generated in S110. The prescribed number of pixel lines may be one pixel line or two or more pixels lines, for example. In S120 color conversion is executed on the plurality of pixels in the target pixel lines, i.e., the pixel lines selected to be processed. In S130 the halftone process is executed on the plurality of pixels in the target pixel lines (described later in greater detail). In S140 print data for the target pixel lines is generated. In S150 the print data for the target pixel lines is supplied to the print execution section (the printer 290, for example). When the process of S120-S150 has been completed for the target pixel lines, the target pixel lines are updated to unprocessed pixel lines and the process in S120-S150 is repeated for the new target pixel lines. Upon receiving print data for the target pixel lines, in S160 the print execution section prints a portion of the image based on the received print data prior to receiving print data for other pixel lines. Alternatively, the print execution section may wait to begin printing the image until print data for all pixel lines has been received. Once the process in S120-S150 has been completed for all pixel lines and the print execution section has completed printing the image in S160, the printing process of FIG. 6 ends.

When the process of S120-S150 is repeated for each of the prescribed number of pixel lines in this way, the storage device that stores process data (the volatile storage device or nonvolatile storage device, for example) need only store a portion of the second bitmap data representing the target pixel lines rather than storing all second bitmap data simultaneously. Therefore, the capacity of the storage device used for the printing process can be reduced. In the embodiments, the capacities of the storage devices 220 and 230 in the multifunction peripheral 200 (see FIG. 1) are smaller than the capacities of the storage devices 120 and 130 in the image processor 100. Thus, the multifunction peripheral 200 can execute the printing process of FIG. 6 with these small storage devices 220 and 230. In the following description, it is assumed that the controller 202 of the multifunction peripheral 200 (and specifically the processor 210) executes the printing process of FIG. 6.

Figure 7:
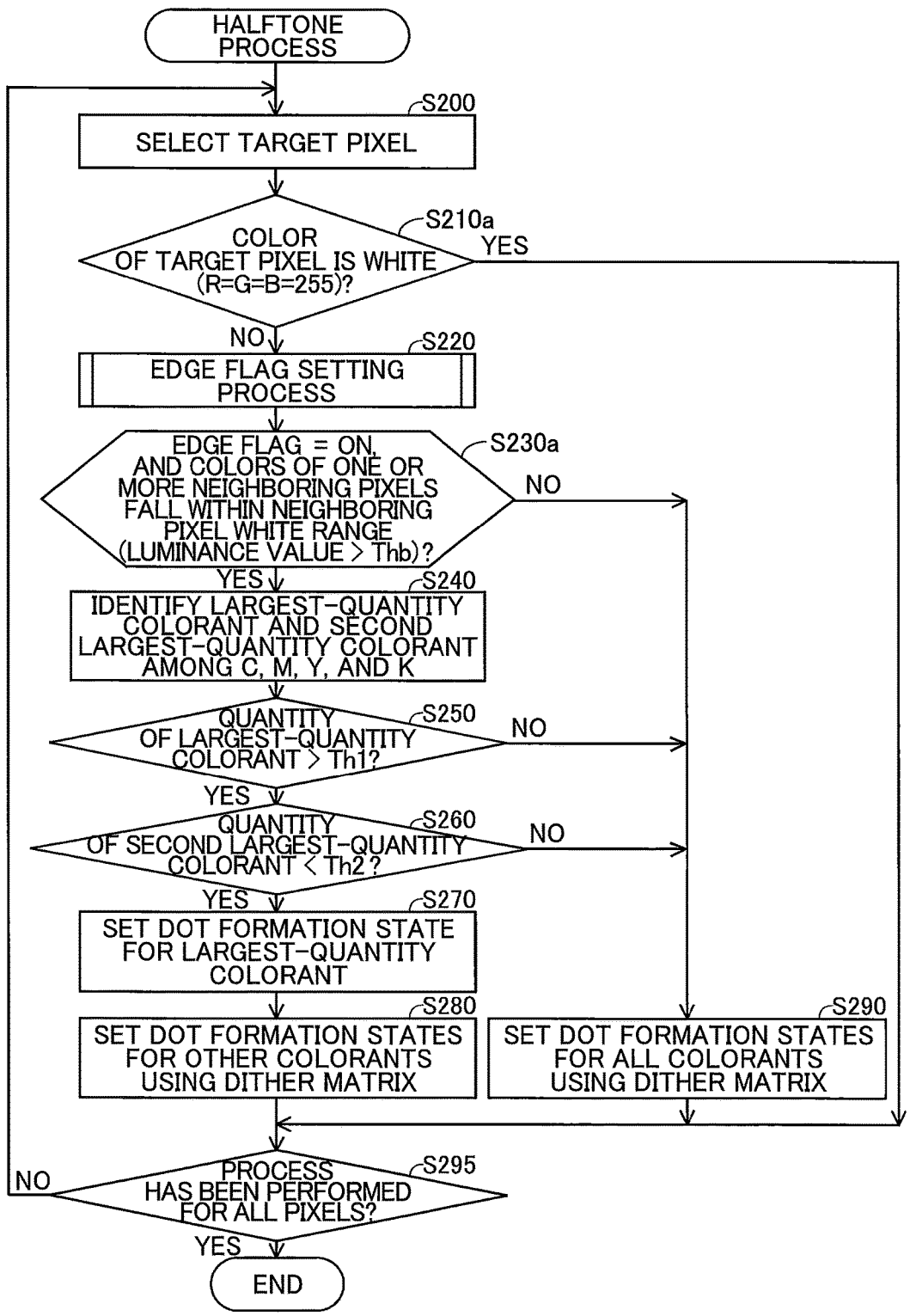
FIG. 7 is a flowchart showing steps in the halftone process in FIG. 6.

FIG. 7 is a flowchart showing steps in the halftone process according to the second embodiment. The halftone process in FIG. 7 differs from the process in the first embodiment described in FIG. 4 in that S210 and S230 are replaced with S210a and S230a. The remaining steps in FIG. 7 are identical to the corresponding steps in FIG. 4. Therefore, similar steps to those in FIG. 4 are designated with the same step numbers in FIG. 7, and a description of these steps has been omitted.

In S210a the processor 210 of the multifunction peripheral 200 determines whether color of the target pixel is white. Unlike S210 of FIG. 4, the processor 210 makes the determination in S210a based on the RGB gradation values represented by the first bitmap data. It is noted that white is the brightest color among all the colors defined by all the possible RGB gradation values. In other words, white is the brightest color within the entire RGB color range of the RGB color space. In the second embodiment, the processor 210 determines that the color of the target pixel is white when all RGB values are 255. When the target pixel is white (S210a: YES), the processor 210 advances to S295. The processor 210 reaches a YES determination in S210a when the target pixel represents the background and is adjacent to the edge of an object, and reaches a NO determination in S210a when the target pixel represents an object. If the target pixel is a color different from white (S210a: NO), the processor 210 advances to S220 and executes the edge flag setting process.

FIG. 8 is a flowchart illustrating steps in the edge flag setting process according to the second embodiment. This process differs from the process in the first embodiment described in FIG. 5 in that step S300 is replaced with S300a. All other steps in FIG. 8 are identical to the corresponding steps in FIG. 5. Therefore, steps in FIG. 8 that are similar to those in FIG. 5 are designated with the same step numbers, and a description of these steps has been omitted.

In S300a the processor 210 calculates a process value for each of nine pixels Px centered on the target pixel Pt. In the second embodiment, the processor 210 calculates the process values using the gradation values of color components independent from the colorants (RGB components in this example) rather than gradation values corresponding to the colorants (and specifically, gradation values representing the quantity of colorant per unit area). Specifically, the process value in the second embodiment is a luminance value Yv obtained from the RGB gradation values represented by the first bitmap data. The luminance value Yv may be a value calculated using a well-known relational expression correlating gradation values in the RGB color space with gradation values in the YCbCr color space, for example.

In this example, the luminance value Yv for each pixel may be calculated by the following expression:

$$Yv=0.299 \times R+0.587 \times G+0.114 \times B,$$

wherein the R, G, and B are the RGB gradation values of the each pixel in the first bitmap data.

Here, a smaller luminance value Yv denotes a higher density for the target pixel.

The luminance values Yv are used as process values in steps S310-S390. A partial color range that includes white is used as the white range in steps S330 and S350. More specifically, in S330 and S350, the white range is a part of the entire color range that is defined by all the possible process values (luminance values Yv, in this example). The white range includes white, wherein white is the brightest color in the entire color range. In other words, the process value (the luminance value Yv in this case) corresponding to white is the highest value of brightness among all the possible process values (the largest possible luminance value Yv). A range of process values (luminance values Yv in this case) greater than a predetermined threshold (204, for example) and smaller than or equal to the largest possible luminance value (255, for example) may be used as the white range, for example. As with the sum of CMYK values used as the process value in the first embodiment of FIG. 5, the luminance value Yv changes in response to a change in color. When using the luminance value Yv as the process value, the edge flag is set to ON when the target pixel represents the edge of an object or a thin line having a width of one pixel, as in the first embodiment of FIG. 5.

In S230a of FIG. 7, the processor 210 determines whether the colors of neighboring pixels fall within the predetermined neighboring-pixel white range using the RGB gradation values for the four neighboring pixels. The gradation values represented by the first bitmap data are used as the RGB gradation values. The neighboring-pixel white range is a partial color range that includes white. More specifically, the neighboring-pixel white range is a part of the entire RGB color range that is defined by all the possible RGB gradation values. The neighboring-pixel white range contains white, wherein white is the brightest color in the entire RGB color range. In the embodiment, the processor 210 uses the luminance value Yv obtained based on the RGB gradation values to determine whether the color of the neighboring pixel falls within the neighboring-pixel white range. The luminance value Yv corresponding to white is the highest value of brightness (255 in this example) among all the possible luminance values Yv (0 to 255 in this example). Accordingly, the neighboring-pixel white range may be such a color range, in which the luminance values Yv are greater than a threshold Thb and smaller than or equal to 255, for example. The threshold Thb may be a value approximately 80% of the maximum value among all the possible luminance values Yv (204 (=255×80%), for example), and therefore the neighboring-pixel white range may be such a color range, in which the luminance values are greater than 204 and smaller than or equal to 255. If the colors of all four neighboring pixels fall outside the neighboring-pixel white range, the target pixel could represent an inner part of an object. In this case, the processor 210 reaches a NO determination in S230a (the processor 210 reaches a NO determination in S230a even when the edge flag is OFF). If the processor 210 reaches a NO determination in S230a, the processor 210 advances to S290. However, if the processor 210 determines that the conditions of the edge flag being on and one or more of the four neighboring pixels falling in the neighboring-pixel white range have been met (S230a: YES), the processor 210 advances to S240. The processes from S240 and S290 are identical to those in the first embodiment described in FIG. 4. Note that the processor 210 determines in S295 whether the process has been completed for all pixels in the target pixel lines.

In the second embodiment described above, the edge flag setting process of FIG. 8 is performed based on RGB gradation values rather than using gradation values expressing the quantity of colorant per unit area. Therefore, the processor 210 can execute the edge flag setting process, without converting the RGB gradation values of pixel lines, other than the pixel lines being processed, to those gradation values representing the quantities of colorants. Thus, the processor 210 can execute the halftone process for each of the prescribed number of pixel lines from among the plurality of pixel lines, as described in FIG. 6. Hence, an image processor provided with small-capacity storage devices, as in the controller 202 of the multifunction peripheral 200, can execute the printing process of the second embodiment. However, the processes in FIGS. 6-8 may be executed by an image processor provided with large-capacity storage devices (the image processor 100, for example). In such a case, the process in S120-S150 of FIG. 6 may be executed just one time for all pixels, as described in the first embodiment in FIG. 2.

Further, in the edge flag setting process of FIG. 8, the processor 210 determines whether to set the edge flag to ON based on the luminance value Yv obtained using the RGB gradation values. In S310 and S320, weights W1 and W2 equivalent to edge quantities are calculated based on the luminance values Yv, for example. In S330 and S350, the processor 210 determines whether the target pixel Pt is a candidate for a thin-line pixel using the luminance values Yv for the target pixel Pt and both pixels neighboring the target pixel Pt. The luminance value Yv changes in response to a change in pixel color. Accordingly, the processor 210 can calculate suitable weights W1 and W2 based on the luminance values Yv in order to determine whether the target pixel Pt is a candidate for a thin-line pixel.

C. Variations of the Embodiments (1) Various other conditions for determining whether the target pixel is an edge pixel may be used in place of the condition in S370 requiring that at least one of the weights W1 and W2 calculated in S310 and S320 of FIGS. 5 and 8 be greater than 0. For example, any filter capable of detecting edges, such as a Sobel filter or a Prewitt filter, may be employed as the edge detection filter in place of the filter used in FIGS. 5 and 8.

(2) Various other conditions for determining whether the target pixel is a candidate for a thin-line pixel representing a thin line with a width of one pixel may be used in place of the conditions described in S330 and S350 of FIGS. 5 and 8. For example, the conditions may include a condition requiring that the absolute difference between the process value of a first pixel adjacent to the target pixel Pt in a specific direction, and a second pixel adjacent to the target pixel Pt in the opposite direction be less than a reference value. The condition VN1=VN3 in S330 of FIGS. 5 and 8 is equivalent to the condition that the absolute difference between VN1 and VN3 is less than 1. Similarly, the condition that VU2=VD2 in S350 of FIGS. 5 and 8 is equivalent to the condition that the absolute difference between VU2 and VD2 is less than 1. In both cases, the reference value may be greater than 1.

(3) Various values that change in response to a change in the color of the target pixel may be used as the process value in the processes of FIGS. 5 and 8. For example, the process value may be calculated as a weighted sum of CMYK gradation values in S300 of FIG. 5. Here, the weight for each colorant may be set to a value that is larger when a solid region of the colorant has lower reflection density (i.e., is dark), for example. Further, in S300a of FIG. 8, the gradation value for green may be used unaltered as the process value. In this way, it is possible to employ a value related to the density of the target pixel as the process value. Further, a value obtained using the gradation values represented by the target image data in the halftone process may be used as the process value. In the example of FIG. 8, the luminance value Yv is the process value acquired based on the RGB gradation values. The CMYK gradation values in the target image data are acquired through color conversion performed on the RGB gradation values (S120 of FIG. 6). The original RGB gradation values can be obtained by performing a reverse color conversion process on these CMYK gradation values. Hence, the luminance value Yv can be considered a process value obtained using CMYK gradation values represented in the target image data (the second bitmap data in this example). In general, the process value may be any of various values related to the pixel, i.e., any of various values associated with the pixel.

(4) Various other conditions may be used in place of the conditions described in the examples of FIGS. 4 and 7 for determining whether a dot is to be formed at the target pixel irrespective of the density of the target pixel, as in S270 of the embodiment. For example, the condition in S210 or S210a may require that the color of the target pixel be outside a target-pixel white range. The target-pixel white range is a partial color range that includes white. For example, the target-pixel white range may be a part of the entire RGB color range of the RGB color space, in which the first bitmap data (RGB data) is defined, and contain white that is the brightest color within the entire RGB color range. Further, the target-pixel white range may be a part of the entire CMYK color range of the CMYK color space, in which the second bitmap data (CMYK data) is defined, and contain white that is the brightest color within the entire CMYK color range.

For example, in S210 of FIG. 4, the sum of the CMYK gradation values for the target pixel is used to determine whether the color of the target pixel is outside the target-pixel white range. The sum of the CMYK gradation values corresponding to white is the highest value of brightness among all possible sums (sum=0, for example). The target-pixel white range in this case may be a color range in which the sums of CMYK gradation values are greater than or equal to zero (0) and less than a threshold, wherein the threshold is greater than zero (0). A weighted sum of CMYK gradation values may also be used in place of the sum of CMYK gradation values. Further, the target-pixel white range may be configured of a range of C gradation values, a range of M gradation values, a range of Y gradation values, and a range of K gradation values. In this case, the target-pixel white range may be the color range in which each of the CMYK gradation values is greater than or equal to zero (0) and less than a threshold set for the corresponding color component.

Further, in S210a of FIG. 7, the luminance value Yv acquired based on the RGB gradation values of the target pixel may be used to determine whether the color of the target pixel is outside the target-pixel white range. The luminance value Yv corresponding to white is the highest value of brightness among all the possible luminance values Yv (the maximum value in the range of possible luminance values Yv in this case). The target-pixel white range in this example may be a color range in which luminance values Yv are greater than a threshold and smaller than or equal to the maximum value of all the possible luminance values Yv, wherein the threshold is less than the maximum value of all the possible luminance values Yv. Further, the target-pixel white range may be configured of a range of R gradation values, a range of G gradation values, and a range of B gradation values. In this case, the target-pixel white range may be the color range in which each of the RGB gradation values is greater than a threshold set for the corresponding color component and smaller than or equal to the maximum value in the possible range of the corresponding color component.

In all of the above examples, the process may advance to S220 when a NO determination is reached in S210 or S210a.

Further, S260 may be omitted from the processes in FIGS. 4 and 7. In this case, the process advances to S270 when the processor 210 reaches a YES determination in S250. In addition, S280 may be omitted from these processes. Further, S210 and S210a may be omitted. The conditions related to neighboring pixels may also be omitted from S230 and S230a.

The order for determining whether conditions are met in the processes of FIGS. 4 and 7 is arbitrary. For example, the processor 210 may execute step S210 or S210a after the corresponding step S230 or S230a. Further, the processor 210 may execute step S250 before step S230.

In all cases, the value of the process target is expressed in digital data when a computer or logic circuit is processing the data. Digital data can represent integers or real numbers discretely. Here, the condition "the value is greater than a threshold" is equivalent to the condition "the value is greater than or equal to a larger threshold" expressed using the larger threshold that is one step (one least significant digit) larger than the threshold. Similarly, the condition "the value is smaller than a threshold" is equivalent to the condition "the value is less than or equal to a smaller threshold" expressed using the smaller threshold that is one step (one least significant digit) smaller than the threshold.

(5) In the halftone process described above, the processor 210 may perform a process based on an error diffusion method in S280 and S290 of FIGS. 4 and 7. Further, the printer 290 in the embodiments described above can form dots in only one size. Hence, the dot formation state for each pixel is expressed as one of two values indicating a state in which a dot is formed and a state in which a dot is not formed. However, the printer 290 may be capable of forming dots having a plurality of different sizes. For example, the printer 290 may print images using three types of dots, including a large dot, a medium dot, and a small dot. In this case, the dot formation state is expressed as one of four values representing the three states in which dots are formed in the three different sizes, and the state in which a dot is not formed. When multiple types of dots are used for printing, the processor 210 preferably sets the dot formation state to form a dot of a size larger than the minimum dot size in S270 of FIGS. 4 and 7. This size may be predetermined or may be set based on the density of the target pixel.

(6) Various other image data may be used as the input data in the printing process of FIGS. 2 and 6 in place of image data supplied by an application program. For example, image data stored on the nonvolatile storage device 130 may be used as the input data. Further, image data stored on an external storage device connected to the image processor 100 (USB memory, for example) may be used as the input data. In all cases, the user may specify the input data. Further, the input data may be expressed in any format, such as the JPEG (Joint Photographic Experts Group) format or the PDF (Portable Document Format) format. The input data may also be expressed in a color space other than the RGB color space, such as the YCbCr color space or the CMYK color space.

(7) The results of determining whether target pixels are candidates for thin-line pixels may be used in other image processes in addition to the printing process (and specifically the halftone process). For example, the results of determining thin-line pixel candidates may be applied to a character recognition process for recognizing characters in an image. By recognizing characters using candidate pixels for thin-line pixels as pixels representing characters, the character recognition process can reliably recognize small characters. In this way, in place of the image data used in the printing process (for example, the input image data, the first bitmap data, and the target image data in the halftone process), other various image data may be subjected to a process for determining whether a target pixel is a candidate for a thin-line pixel.

(8) The printer 290 may employ various other colorants for printing instead of the CMYK colorants. For example, the printer 290 may simply use a black colorant. When the printer 290 uses a single colorant for printing, steps S260 and S280 may be omitted from FIGS. 4 and 7.

The image processor 100 that executes the printing process may be a device other than a personal computer (a digital camera, scanner, or smartphone, for example). Further, as exemplified by the controller 202 in the multifunction peripheral 200, the image processor executing the printing process may constitute part of the printing apparatus having the printer 290 (the multifunction peripheral 200, for example). Further, a plurality of devices that can communicate over a network (computers, for example) may each implement some of the functions of the image processor so that the devices as a whole can provide the functions required for implementing the image processes. (Here, the system including the devices corresponds to the image processor.)

In the embodiments described above, part of the configuration implemented in hardware may be replaced with software and, conversely, all or part of the configuration implemented in software may be replaced with hardware. For example, a dedicated hardware circuit may be provided to execute the halftone process in S130 of FIGS. 2 and 6.

When all or some of the functions of the present disclosure are implemented with computer programs, the programs can be stored on a computer-readable storage medium (a non-temporary storage medium, for example). The programs may be used on the same storage medium on which the programs were supplied, or may be transferred to a different storage medium (computer-readable storage medium). The "computer-readable storage medium" may be a portable storage device, such as a memory card or CD-ROM; an internal storage device built into the computer, such as any of various ROM or the like; or an external storage device, such as a hard disk drive, connected to the computer.

While the description has been made in detail with reference to the specific embodiments thereof, it would be apparent to those skilled in the art that various changes and modifications may be made therein without departing from the spirit and scope of the above described aspects.

What is claimed is:

1. An image processing apparatus, comprising:
a controller configured to perform:
specifying input image data;
executing a halftone process onto target image data to thereby generate processed data, the target image data being obtained based on the input image data and representing a target image in which a plurality of pixels are arranged, the target image data including a colorant-corresponding gradation value for each of the plurality of pixels, the colorant-corresponding gradation value for each pixel being defined for a color component corresponding to colorant and representing density of the color component in color of the each pixel, the processed data representing a dot formation state for each pixel; and
supplying the processed data to a print execution section that is configured to print images by using the colorant,
the executing the halftone process including:
judging whether a target pixel among the plurality of pixels is an edge pixel representative of an edge of an object in the target image;
executing a first judgement to determine whether a density index value for the target pixel is greater than a threshold value, the density index value for the target pixel being related to the density of the color component in the color of the target pixel that is represented by the colorant-corresponding gradation value for the target pixel;
in a case where a dot forming condition is not satisfied, executing a first dot formation determination, the dot forming condition including a condition that the target pixel is an edge pixel and another condition that the density index value is greater than the threshold value, the first dot formation determination being configured to determine whether to form a dot for the target pixel dependently on the colorant-corresponding gradation value for the target pixel and according to a predetermined method; and
in a case where the dot forming condition is satisfied, executing a second dot formation determination to determine that a dot is to be formed for the target pixel, irrespective of the colorant-corresponding gradation value for the target pixel.

2. The image processing apparatus according to claim 1, wherein the print execution section is a printing device configured to print images by using a plurality of kinds of colorant,
wherein the target image data includes a plurality of colorant-corresponding gradation values for each pixel, each colorant-corresponding gradation value being defined for a color component corresponding to one of the plurality of kinds of colorant and indicating a quantity of the corresponding kind of colorant per unit area required to be used to reproduce a density of the corresponding color component in the color of the each pixel, and
wherein a largest colorant-corresponding gradation value among the plurality of colorant-corresponding gradation values for the target pixel is used as the density index value for the target pixel.

3. The image processing apparatus according to claim 2,
wherein the threshold value is a first threshold value,
wherein the first judgement is executed to judge whether
the largest colorant-corresponding gradation value for
the target pixel is greater than the first threshold value,
and
wherein the executing the halftone process further
includes:
executing a second judgment in which a second largest
colorant-corresponding gradation value among the
plurality of colorant-corresponding gradation values
for the target pixel is smaller than a second threshold
value,
wherein the dot forming condition further includes a
condition that the second largest colorant-corresponding gradation value is smaller than the second threshold
value, and
wherein the second dot formation determination is configured to determine that a dot is to be formed for the
target pixel by using one kind of colorant that corresponds to the largest colorant-corresponding gradation
value for the target pixel.

4. The image processing apparatus according to claim 3,
wherein the second dot formation determination is configured to further determine, according to the predetermined
method, whether to form a dot for the target pixel by using
a kind of colorant other than the kind of colorant corresponding to the largest colorant-corresponding gradation
value.

5. The image processing apparatus according to claim 1,
wherein the dot forming condition further includes a condition that color of the target pixel is outside a target-pixel
white range, the target-pixel white range being a partial
color range in an entire color range of a prescribed color
space, either one of the input image data and the target image
data being defined in the prescribed color space, the partial
color range containing white that is the brightest in the entire
color range.

6. The image processing apparatus according to claim 1,
wherein the plurality of pixels are arranged in the target
image in a first direction and a second direction
orthogonal to the first direction, and
wherein the dot forming condition further includes a
condition that color of at least one neighboring pixel
among four pixels neighboring the target pixel falls
within a neighboring-pixel white range, the four neighboring pixels being positioned adjacent to the target
pixel at a pair of opposite sides of the target pixel in
each of the first and second directions in the target
image, the neighboring-pixel white range being a partial color range in an entire color range of a prescribed
color space, either one of the input image data and the
target image data being defined in the prescribed color
space, the partial color range containing white that is
the brightest in the entire color range.

7. The image processing apparatus according to claim 1,
wherein the predetermined method is configured to determine whether to form a dot for the target pixel, by using both
of a dither matrix and the colorant-corresponding gradation
value for the target pixel.

8. The image processing apparatus according to claim 1,
wherein the colorant-corresponding gradation value for
each pixel in the target image data indicates a quantity
of the colorant per unit area required to be used to
reproduce the density of the corresponding color component in the color of the each pixel,
wherein the input image data includes RGB gradation
values for each pixel, the RGB gradation values being
defined in an RGB color space, and
wherein it is judged whether the target pixel is an edge
pixel by using the RGB gradation values for the target
pixel, rather than by using the colorant-corresponding
gradation value for the target pixel.

9. The image processing apparatus according to claim 1,
wherein the colorant-corresponding gradation value for each
pixel in the target image data indicates a quantity of the
colorant per unit area required to be used to reproduce the
density of the corresponding color component in the color of
the each pixel.

10. The image processing apparatus according to claim 1,
wherein the controller includes a processor and a memory.

11. A non-transitory computer readable storage medium
storing a set of program instructions for an image processing
apparatus, the image processing apparatus including a processor, the program instructions, when executed by the
processor, causing the image processing apparatus to perform:
specifying input image data;
executing a halftone process onto target image data to
thereby generate processed data, the target image data
being obtained based on the input image data and
representing a target image in which a plurality of
pixels are arranged, the target image data including a
colorant-corresponding gradation value for each of the
plurality of pixels, the colorant-corresponding gradation value for each pixel being defined for a color
component corresponding to colorant and representing
density of the color component in color of the each
pixel, the processed data representing a dot formation
state for each pixel; and
supplying the processed data to a print execution section
that is configured to print images by using the colorant,
the executing the halftone process including:
judging whether a target pixel among the plurality of
pixels is an edge pixel representative of an edge of an
object in the target image;
executing a first judgement to determine whether a
density index value for the target pixel is greater than
a threshold value, the density index value for the
target pixel being related to the density of the color
component in the color of the target pixel that is
represented by the colorant-corresponding gradation
value for the target pixel;
in a case where a dot forming condition is not satisfied,
executing a first dot formation determination, the dot
forming condition including a condition that the
target pixel is an edge pixel and another condition
that the density index value is greater than the
threshold value, the first dot formation determination
being configured to determine whether to form a dot
for the target pixel dependently on the colorant-corresponding gradation value for the target pixel
and according to a predetermined method; and
in a case where the dot forming condition is satisfied,
executing a second dot formation determination to
determine that a dot is to be formed for the target
pixel, irrespective of the colorant-corresponding gradation value for the target pixel.

12. The non-transitory computer readable storage medium
according to claim 11,
wherein the print execution section is a printing device
configured to print images by using a plurality of kinds
of colorant, wherein the target image data includes a plurality of colorant-corresponding gradation values for each pixel, each colorant-corresponding gradation value being defined for a color component corresponding to one of the plurality of kinds of colorant and indicating a quantity of the corresponding kind of colorant per unit area required to be used to reproduce a density of the corresponding color component in the color of the each pixel, and wherein a largest colorant-corresponding gradation value among the plurality of colorant-corresponding gradation values for the target pixel is used as the density index value for the target pixel.

13. The non-transitory computer readable storage medium according to claim 12,
wherein the threshold value is a first threshold value,
wherein the first judgement is executed to judge whether the largest colorant-corresponding gradation value for the target pixel is greater than the first threshold value, and
wherein the executing the halftone process further includes:
executing a second judgment in which a second largest colorant-corresponding gradation value among the plurality of colorant-corresponding gradation values for the target pixel is smaller than a second threshold value,
wherein the dot forming condition further includes a condition that the second largest colorant-corresponding gradation value is smaller than the second threshold value, and
wherein the second dot formation determination is configured to determine that a dot is to be formed for the target pixel by using one kind of colorant that corresponds to the largest colorant-corresponding gradation value for the target pixel.

14. The non-transitory computer readable storage medium according to claim 13, wherein the second dot formation determination is configured to further determine, according to the predetermined method, whether to form a dot for the target pixel by using a kind of colorant other than the kind of colorant corresponding to the largest colorant-corresponding gradation value.

15. The non-transitory computer readable storage medium according to claim 11, wherein the dot forming condition further includes a condition that color of the target pixel is outside a target-pixel white range, the target-pixel white range being a partial color range in an entire color range of a prescribed color space, either one of the input image data and the target image data being defined in the prescribed color space, the partial color range containing white that is the brightest in the entire color range.

16. The non-transitory computer readable storage medium according to claim 11,
wherein the plurality of pixels are arranged in the target image in a first direction and a second direction orthogonal to the first direction, and
wherein the dot forming condition further includes a condition that color of at least one neighboring pixel among four pixels neighboring the target pixel falls within a neighboring-pixel white range, the four neighboring pixels being positioned adjacent to the target pixel at a pair of opposite sides of the target pixel in each of the first and second directions in the target image, the neighboring-pixel white range being a partial color range in an entire color range of a prescribed color space, either one of the input image data and the target image data being defined in the prescribed color space, the partial color range containing white that is the brightest in the entire color range.

17. The non-transitory computer readable storage medium according to claim 11, wherein the predetermined method is configured to determine whether to form a dot for the target pixel, by using both of a dither matrix and the colorant-corresponding gradation value for the target pixel.

18. The non-transitory computer readable storage medium according to claim 11,
wherein the colorant-corresponding gradation value for each pixel in the target image data indicates a quantity of the colorant per unit area required to be used to reproduce the density of the corresponding color component in the color of the each pixel,
wherein the input image data includes RGB gradation values for each pixel, the RGB gradation values being defined in an RGB color space, and
wherein it is judged whether the target pixel is an edge pixel by using the RGB gradation values for the target pixel, rather than by using the colorant-corresponding gradation value for the target pixel.

19. The non-transitory computer readable storage medium according to claim 11, wherein the colorant-corresponding gradation value for each pixel in the target image data indicates a quantity of the colorant per unit area required to be used to reproduce the density of the corresponding color component in the color of the each pixel.

20. An image processing method comprising:
specifying input image data;
executing a halftone process onto target image data to thereby generate processed data, the target image data being obtained based on the input image data and representing a target image in which a plurality of pixels are arranged, the target image data including a colorant-corresponding gradation value for each of the plurality of pixels, the colorant-corresponding gradation value for each pixel being defined for a color component corresponding to colorant and representing density of the color component in color of the each pixel, the processed data representing a dot formation state for each pixel; and
supplying the processed data to a print execution section that is configured to print images by using the colorant, the executing the halftone process including:
judging whether a target pixel among the plurality of pixels is an edge pixel representative of an edge of an object in the target image;
executing a first judgement to determine whether a density index value for the target pixel is greater than a threshold value, the density index value for the target pixel being related to the density of the color component in the color of the target pixel that is represented by the colorant-corresponding gradation value for the target pixel;
in a case where a dot forming condition is not satisfied, executing a first dot formation determination, the dot forming condition including a condition that the target pixel is an edge pixel and another condition that the density index value is greater than the threshold value, the first dot formation determination being configured to determine whether to form a dot for the target pixel dependently on the colorant-corresponding gradation value for the target pixel and according to a predetermined method; and
in a case where the dot forming condition is satisfied, executing a second dot formation determination to determine that a dot is to be formed for the target pixel, irrespective of the colorant-corresponding gradation value for the target pixel.

* * * * *